US008208900B2

(12) United States Patent
Adler et al.

(10) Patent No.: US 8,208,900 B2
(45) Date of Patent: Jun. 26, 2012

(54) SECURE DEVICE CONFIGURATION PROFILES

(75) Inventors: Mitchell D. Adler, Cupertino, CA (US); Curtis C. Galloway, Santa Cruz, CA (US); Christophe Allie, Sunnyvale, CA (US); Conrad Sauerwald, Mountain View, CA (US); Dallas Blake De Atley, San Francisco, CA (US); Dieter Siegmund, Santa Cruz, CA (US); Matthew Reda, San Jose, CA (US); Michael Lambertus Hubertus Brouwer, San Jose, CA (US); Roberto G. Yépez, San Francisco, CA (US); Stan Jirman, Santa Clara, CA (US); Nitin Ganatra, San Jose, CA (US)

(73) Assignee: Apple Inc., Cupertino, CA (US)

(*) Notice: Subject to any disclaimer, the term of this patent is extended or adjusted under 35 U.S.C. 154(b) by 680 days.

(21) Appl. No.: 12/347,647

(22) Filed: Dec. 31, 2008

(65) Prior Publication Data

US 2009/0227274 A1 Sep. 10, 2009

Related U.S. Application Data

(60) Provisional application No. 61/033,755, filed on Mar. 4, 2008.

(51) Int. Cl.
*H04M 1/66* (2006.01)
(52) U.S. Cl. ........................ 455/411; 455/418; 455/432.3
(58) Field of Classification Search .................. 455/411, 455/412.1, 412.2, 413, 414.1, 418–420, 466, 455/70, 432.3
See application file for complete search history.

(56) References Cited

U.S. PATENT DOCUMENTS

| | | | |
|---|---|---|---|
| 8,027,444 B1 * | 9/2011 | Martin et al. | 379/201.01 |
| 2002/0065728 A1 * | 5/2002 | Ogasawara | 705/23 |
| 2007/0004391 A1 * | 1/2007 | Maffeis | 455/418 |
| 2007/0004393 A1 * | 1/2007 | Forsberg et al. | 455/420 |

* cited by examiner

*Primary Examiner* — Cong Tran
(74) *Attorney, Agent, or Firm* — Blakely, Sokoloff, Taylor & Zafman LLP

(57) ABSTRACT

A method for configuring a device includes receiving a first configuration profile comprising a first configuration and a first certificate and a second certificate, verifying the first configuration profile with the first certificate, receiving a user input indicating to accept the first configuration profile, configuring the device according to the first configuration, receiving a second configuration profile comprising a second configuration, verifying the second configuration profile with the second certificate and updating the device according to the second configuration, wherein the user is unaware of the updating.

23 Claims, 11 Drawing Sheets

SECURE DEVICE CONFIGURATION PROFILES

This application claims priority to co-pending U.S. Provisional Patent Application No. 61/033,755 filed on Mar. 4, 2008, which provisional application is incorporated herein by reference in its entirety; this application claims the benefit of the provisional's filing date under 35 U.S.C. §119(e).

FIELD OF THE INVENTION

Embodiments of the invention relate to data processing systems, and more particularly to securely configuring devices using profiles.

SUMMARY OF THE DESCRIPTION

In one embodiment described herein, a method for configuring a wireless device includes receiving a request, from the wireless device, to create configuration profile, the request being received by a data processing system of an enterprise, creating, in response to the request, the configuration profile for the wireless device, the configuration profile being designed to configure the wireless device for communication with one or more data processing systems of the enterprise, and wherein the creating includes signing the configuration profile to allow the wireless device to authenticate the configuration profile, and transmitting the configuration profile to the wireless device. The communication may be through a network of devices, and the configuration profile may be transmitted with a connectionless network protocol.

In one embodiment described herein, a method for configuring a wireless device includes receiving, at the wireless device, an input for a request to establish communication with at least one data processing system of an enterprise, and receiving, in response to the request, a configuration profile for the wireless device, the configuration profile being designed to configure the wireless device for communication with the at least one data processing system of the enterprise, wherein the configuration profile is signed to allow the wireless device to authenticate the configuration profile. In one embodiment described herein, a method for configuring a device includes receiving a first configuration profile comprising a first configuration and a first certificate and a second certificate, verifying the first configuration profile with the first certificate, receiving a user input indicating to accept the first configuration profile, configuring the device according to the first configuration, receiving a second configuration profile comprising a second configuration, verifying the second configuration profile with the second certificate and updating the device according to the second configuration, wherein the user is unaware of the updating.

In one embodiment, a user accesses an enterprise website and selects a configuration setting on the enterprise website and the enterprise website creates the first configuration profile using the configuration setting. In one embodiment, receiving the first configuration profile comprises transferring the first configuration profile from one of the following: a website, a media management application, a FTP site, a SMS message, and an e-mail message.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
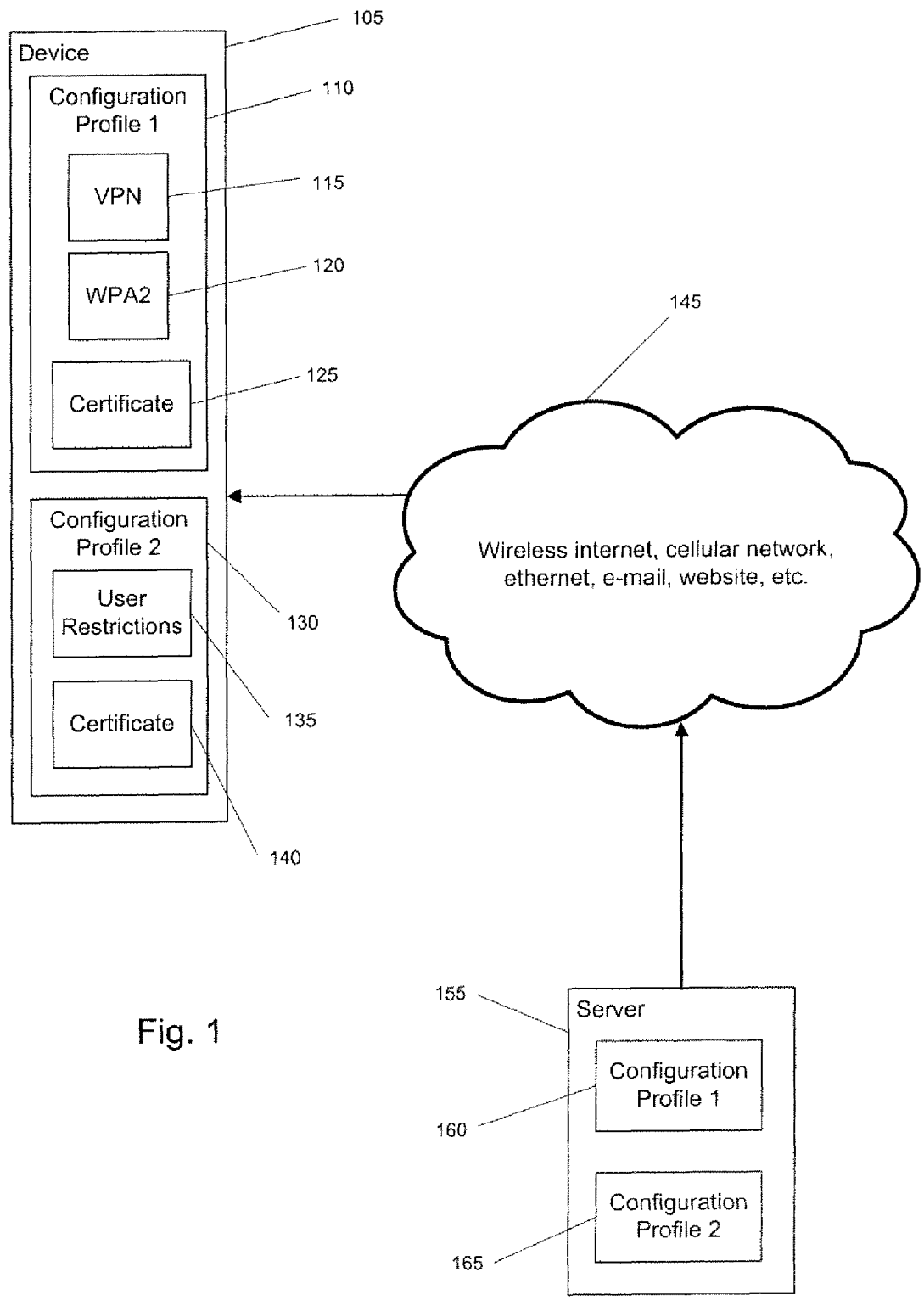
FIG. 1 shows a block diagram of one embodiment of a device configured with a configuration profile transmitted to the device.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device), or devices or consumer electronic products which include a multi-touch input device such as a multi-touch handheld device or a cell phone and handheld computer with a multi-touch input device.

FIG. 1 shows a block diagram of one embodiment of a device configured with a configuration profile transmitted to the device. An enterprise configures device 105 with configuration profiles 110 and 130, which server 155 transmits to device 105 through various transfer means 145. Profiles 160 and 165 correspond to profiles 110 and 130. In one embodiment, profile 110 includes a VPN component 115, a WPA2 component 120, and a certificate 125. In one embodiment, certificate 125 uses well-known public key encryption techniques to sign profile 110. Device 105 can confirm the authenticity of signed profile 110 independently of transfer means 145, since a secured channel is not required to verify the source of the profile. For example, device 105 may receive profile 110 over a wireless internet connection in a coffee shop, over a cellular data network, over a wired Ethernet connection, through an e-mail message, a website, or some other source, such as a media management application. Regardless of the transmission medium, the device is able to verify the authenticity of the configuration profile. For example, the device can verify, through the digital signature which is part of the configuration profile, that the configuration profile came from a particular enterprise.

The particular enterprise may, when creating the configuration profile, sign the profile with its own digital certificate (or have another service sign the profile with a certificate) to prove that the configuration profile is from the enterprise (or otherwise is authorized to be used to configure the device receiving the profile to communicate with a data processing system owned or controlled by the enterprise). The signed profile assures the device that it can rely upon the profile to configure the device for secure (e.g., fully authenticated at both ends) communication between the device and one or more data processing systems of the enterprise.

The enterprise may be a commercial for-profit entity (e.g., Fed Ex), or a government entity (e.g., the U.S. Treasury), or a non-profit entity (e.g., PBS) or an educational entity (e.g., M.I.T.), etc. Once the profile configures the device, it can participate in two-way communication with data processing systems of the enterprise in a secure manner knowing that such systems have been initially authenticated by the initial configuration profile (and vice versa).

VPN 115 and WPA2 120 provide configuration information specific to accessing a virtual private network and a wireless network, respectively. In one embodiment, a virtual private network provides a communication channel between the device and an enterprise data processing system. In one embodiment, data transmitted between the device and the enterprise data processing system through the virtual private network is encrypted. In one embodiment, WPA2 120 includes a root of trust, overcoming a shortcoming in the WPA2 design. Profile 130 includes user restrictions 135 and certificate 140. Certificate 140 operates similarly to certificate 125. In one embodiment, different signing entities provide certificate 125 and certificate 140. User restrictions 135 form part of a policy setting mechanism for the device. In one embodiment, restrictions 135 prevent a cellular phone user from using the phone to make long distance calls. In one embodiment, restrictions 135 prevent the user from using a digital camera built into device 105. In one embodiment, restriction 135 prevents a media player on the device from playing digital media files that fail DRM verification. In one embodiment, restrictions 135 restrict a web-enabled device to a single proxy server for web browsing. In one embodiment, restriction 135 enforces a larger PIN length, which increases security of the device by making it more difficult to penetrate a locked device.

Figure 2:
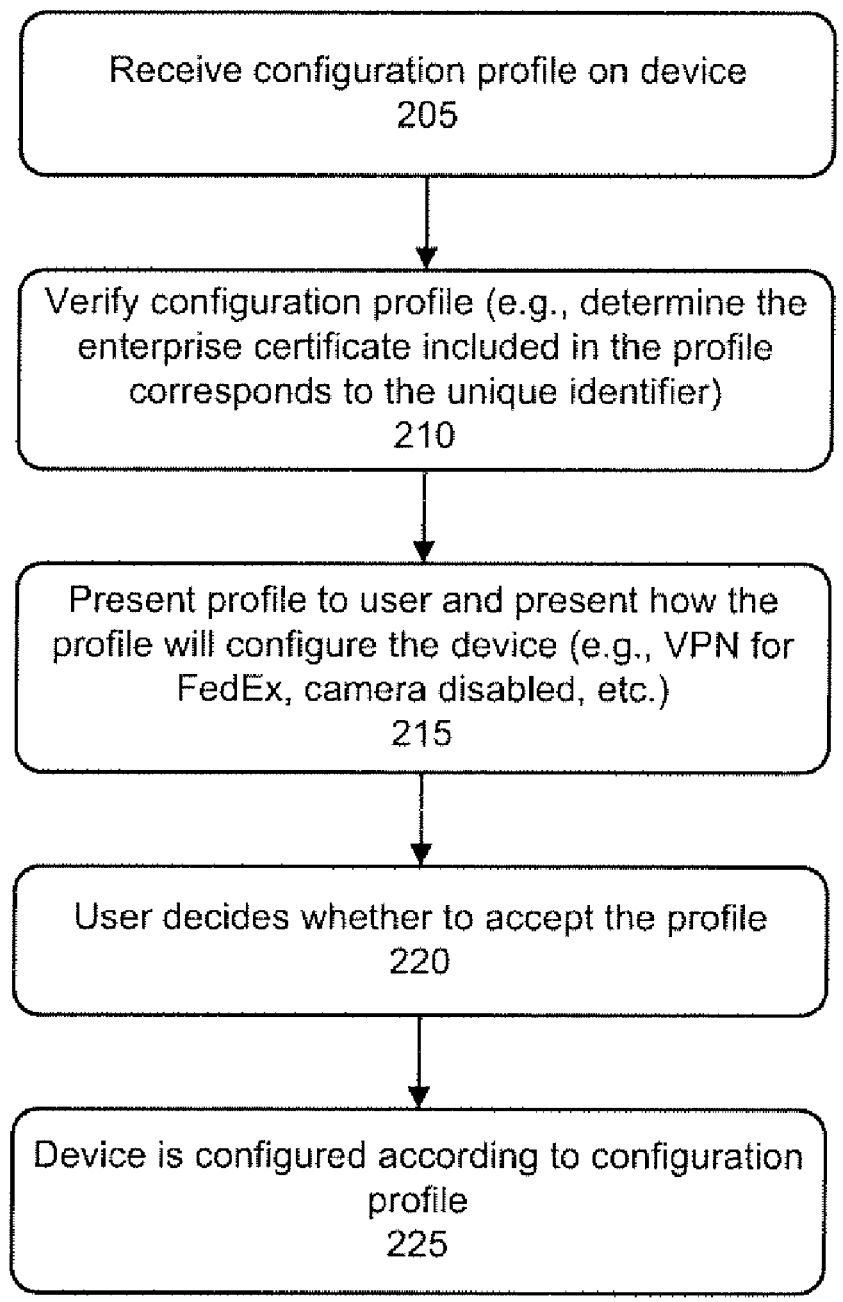
FIG. 2 shows a flowchart of one embodiment of a method for configuring a device with a secure configuration profile.

FIG. 2 shows a flowchart of one embodiment of a method for configuring a device with a secure configuration profile. At block 205, the method receives a configuration profile on the device, such as through transfer means 145 in FIG. 1. At block 210, the method verifies the authenticity of the configuration profile using, for example, a certificate that arrived with the profile. Using known public key infrastructure techniques, the method determines that the signing entity sent the configuration profile (or had the profile sent on its behalf). Since the authenticity of the configuration profile does not depend on a secure transmission channel, the actual medium by which the configuration profile reaches the device is unimportant.

At block 215, the method presents the profile to the user and how the profile will configure the device. It will be understood that block 215 may precede block 210 in time. For example, an enterprise seeking to enforce its ownership of the device would configure the device in several ways. One way would be to provide WPA2 and VPN access for the device. Another would be to restrict certain functions of the device. The configuration might provide a root of trust certificate for the device, allowing the device to authenticate anything using the enterprise as a signature authority. The configuration might provide an identity corresponding to the user of the device, which would allow the user to sign documents and otherwise provide a digital signature via the device.

At block 220, the method receives a user input accepting the profile. In one embodiment, the user must accept configuration profiles in their entirety. In another embodiment, the user may accept configuration profiles piecemeal. For example, an enterprise asserting ownership and setting policy on a device may prefer that users of the enterprise devices accept a configuration entirely. Alternatively, a configuration profile containing several wallpapers for the background of the device display may be accepted piecemeal (i.e., only the desired wallpaper is accepted). At block 225, the method configures the device according the configuration profile received by the method at block 205. In one embodiment, a user may subsequently undo a configuration profile and remove the configuration from the device, or deactivate it while leaving the configuration profile present in a data storage component of the device.

Figure 3:
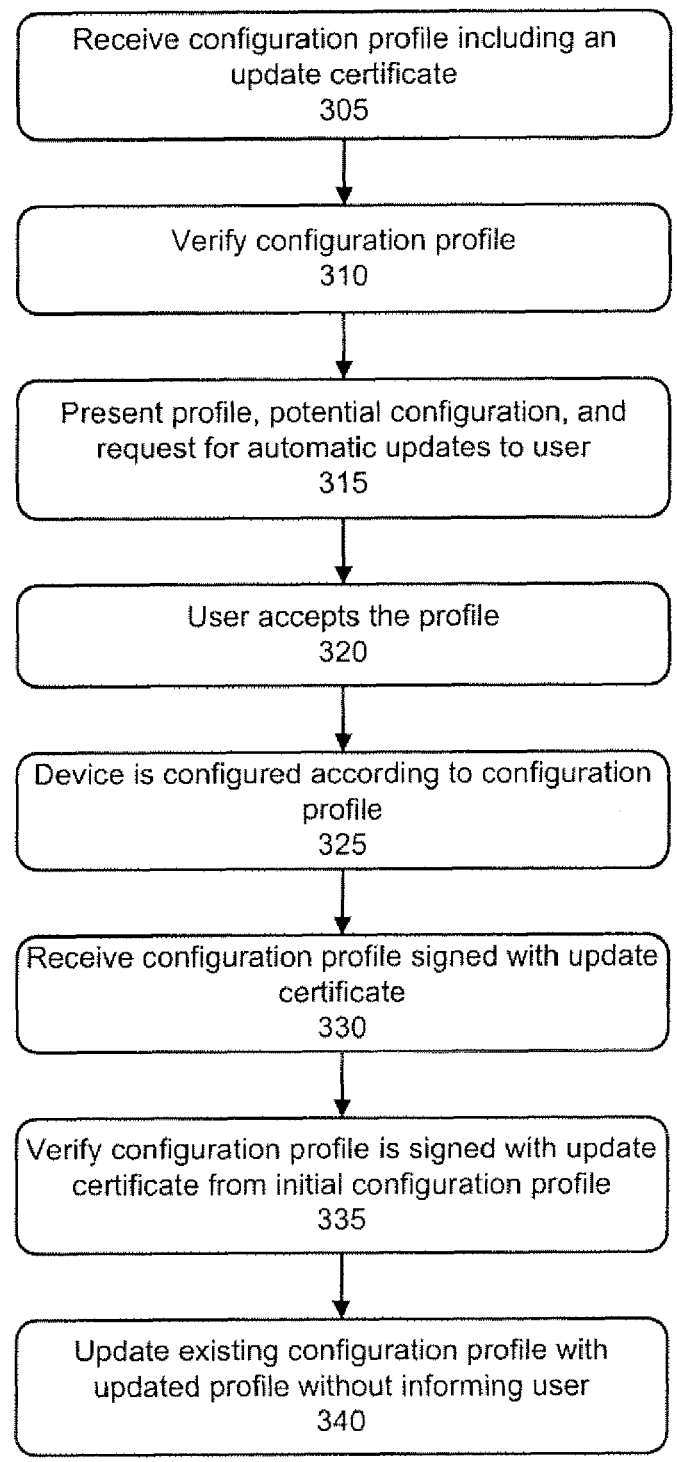
FIG. 3 shows a flowchart of one embodiment of a method for configuring a device with a secure configuration profile and updating the profile.

FIG. 3 shows a flowchart of one embodiment of a method for configuring a device with a secure configuration profile and updating the profile. At block 305, the method receives an initial configuration profile including an update certificate. In one embodiment, an initial configuration profile includes a certificate used to verify the authenticity of the initial configuration profile and a second certificate used to verify the authenticity of subsequent profiles updating the configuration profile. In another embodiment, the device uses the same certificate to authenticate the initial profile and subsequent update profiles.

At block 310, the method authenticates the configuration profile using a certificate contained in the profile. At block 315, the method presents the profile, potential configuration, and the request for automatic updates to the user of the device. It will be understood that block 315 may precede block 310. At block 320, the method receives input from a user accepting the configuration. At block 325, the method configures the device according to the accepted configuration. In one embodiment, an enterprise uses an initial configuration profile to implement policy, network access, etc. on a device. Over time, elements of the initial configuration profile may require changing, such as the VPN access information, the enterprise root of trust, etc. The user, having accepted the initial configuration, is likely to accept the updated configuration as well. The update certificate provided by the initial configuration profile allows the device to determine that an update configuration profile is an authentic update to a previously accepted initial configuration profile.

At block 330, the device receives a configuration profile signed with the update certificate received at block 305, such as through transfer means 145 in FIG. 1. In one embodiment, the device need not receive the update profile through the same transfer means as the initial configuration profile received by the method at block 305. At block 335, the method verifies that the update certificate from the initial configuration profile has signed the configuration profile received at block 330. At block 340, the method updates the existing configuration profile with the updated profile received at block 335 without informing the user. In one embodiment, the profile received at block 330 signed with the update certificate is only entitled to modify elements of the device configuration modified by the initial configuration profile. In another embodiment, the update profile may modify more or less of the device configuration than that modified by the initial configuration profile.

Figure 4:
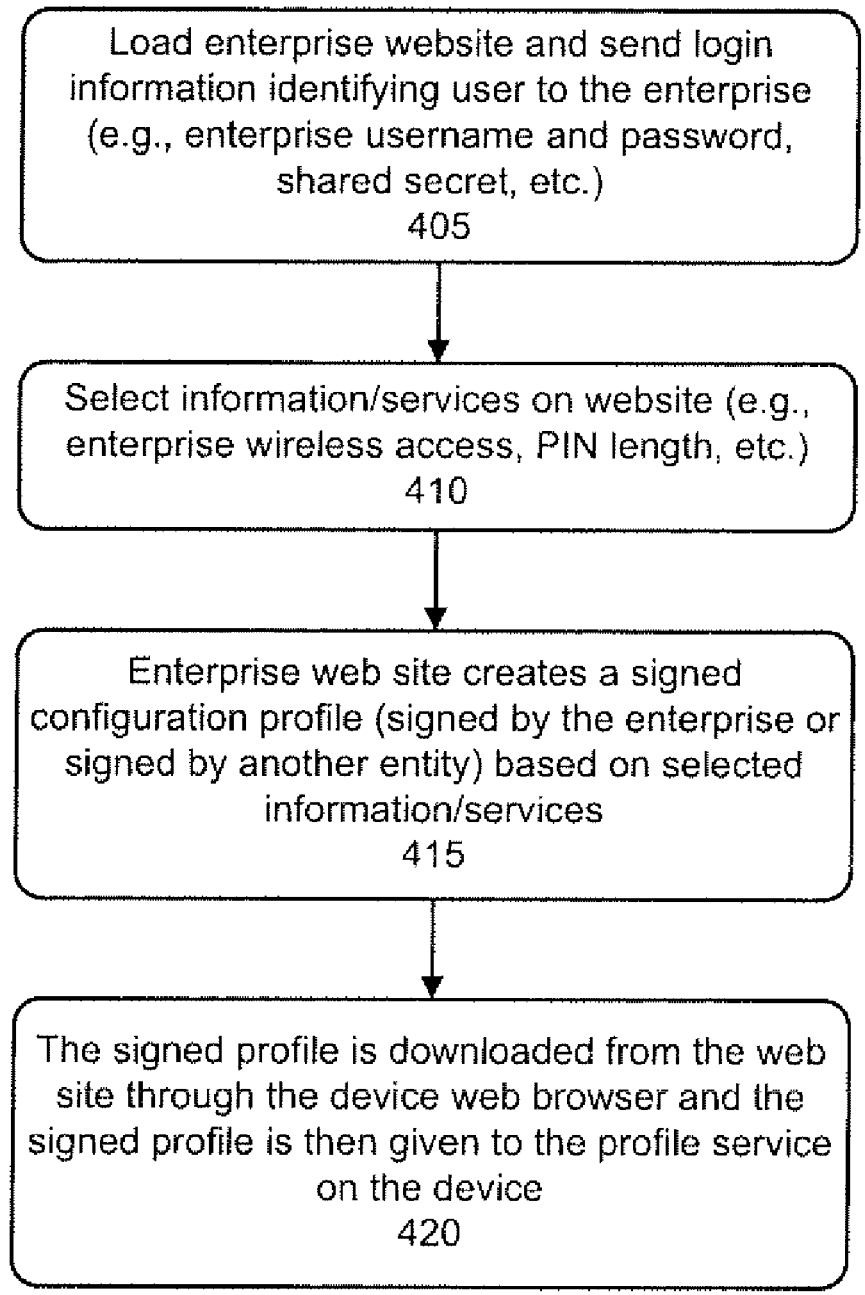
FIG. 4 shows a flowchart of one embodiment of a method for creating a secure device configuration profile.

FIG. 4 shows a flowchart of one embodiment of a method for creating a secure device configuration profile. At block 405, a user loads an enterprise website using a web browser and sends login information identifying the user to the enterprise. In one embodiment, the user loads the enterprise website from a device the user is seeking to configure. In one embodiment, the enterprise website is an intranet website and the user loads the website from within the enterprise network.

At block 410, the user selects, through a user interface provided by the enterprise website, one or more settings, services, and information sources. For example, the user may select a VPN configuration, an identity, a root of trust certificate for the enterprise, a proprietary application used by the enterprise on devices of this kind, a file containing the enterprise phone listing, etc. In one embodiment, the user selects from a list of pre-existing configurations. For example, an enterprise IT group may create configurations. In one embodiment, the user is restricted as to which configurations or settings the user can select. At block 415, the enterprise website creates a configuration profile containing the settings, services, and information sources selected by the user at block 410. Using the enterprise key, the website signs the configuration profile and inserts the certificate into the profile, allowing the device to authenticate the profile. At block 420, the device downloads the signed configuration profile from the website, through the web browser on the device, for use by the profile service. In one embodiment, the profile service is associated with a configuration profile user interface providing high level and detailed views and management features for managing configuration profiles on the device. In one embodiment, a media management application, such as Apple iTunes®, creates the signed profile. In one embodiment, the enterprise website is accessed from a data processing system other than the device and the signed configuration profile is sent to the device through, for example, transfer means 145 in FIG. 1.

Figure 5:
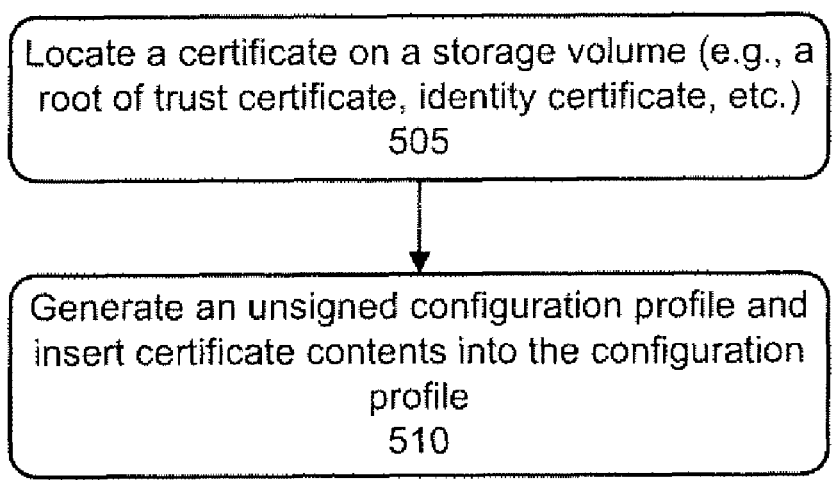
FIG. 5 shows a flowchart of one embodiment of a method for creating a device configuration profile.

FIG. 5 shows a flowchart of one embodiment of a method for creating a device configuration profile. At block 505, the method locates a certificate on a storage volume. For example, a root of trust certificate or an identity certificate. At block 510, the method generates an unsigned configuration profile and inserts the contents of the located certificate into the configuration profile. In one embodiment, unsigned configuration profiles containing certificate information allows the user of the device to utilize the profile system and associated user interface to manage the contents of the certificates. In one embodiment, a user e-mails certificates containing various identities of the user to the user's device and creates unsigned configuration profiles to wrap the certificates. In one embodiment, the user is able to modify an existing configuration profile using the unsigned configuration profile. For example, the user may replace a root of trust in an existing configuration with a root of trust certificate contained in an unsigned configuration profile. In one embodiment, a root of trust certificate may be referred to as an anchor certificate.

Figure 6:
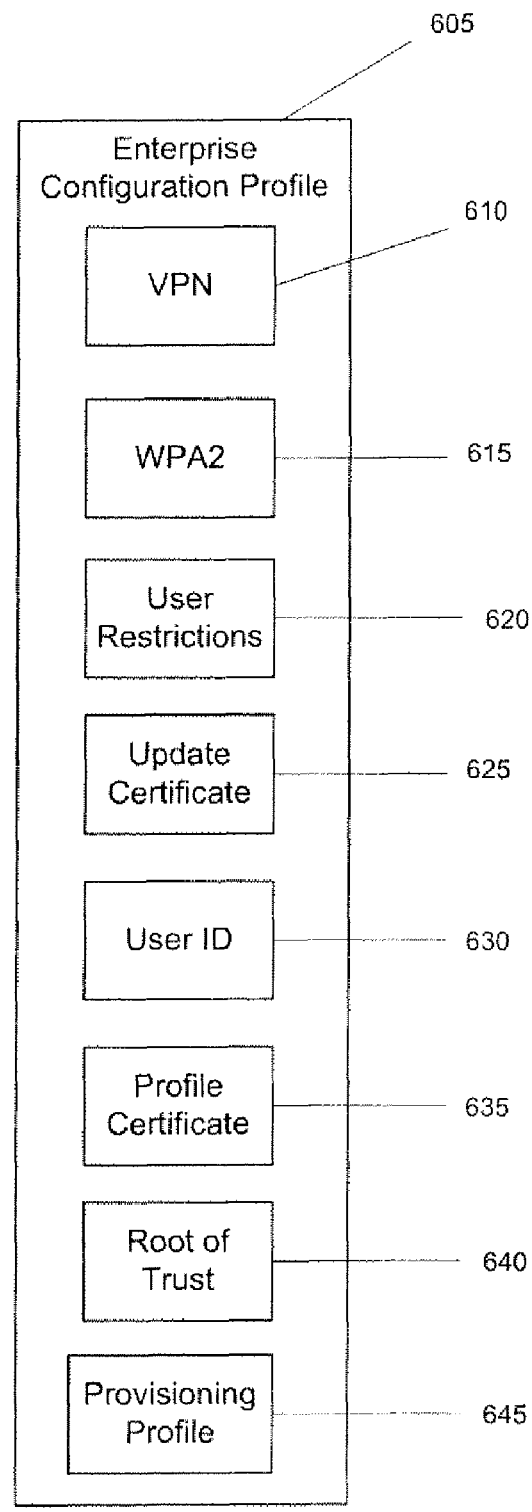
FIG. 6 shows a block diagram of one embodiment of a secure configuration profile.
Figure 9:
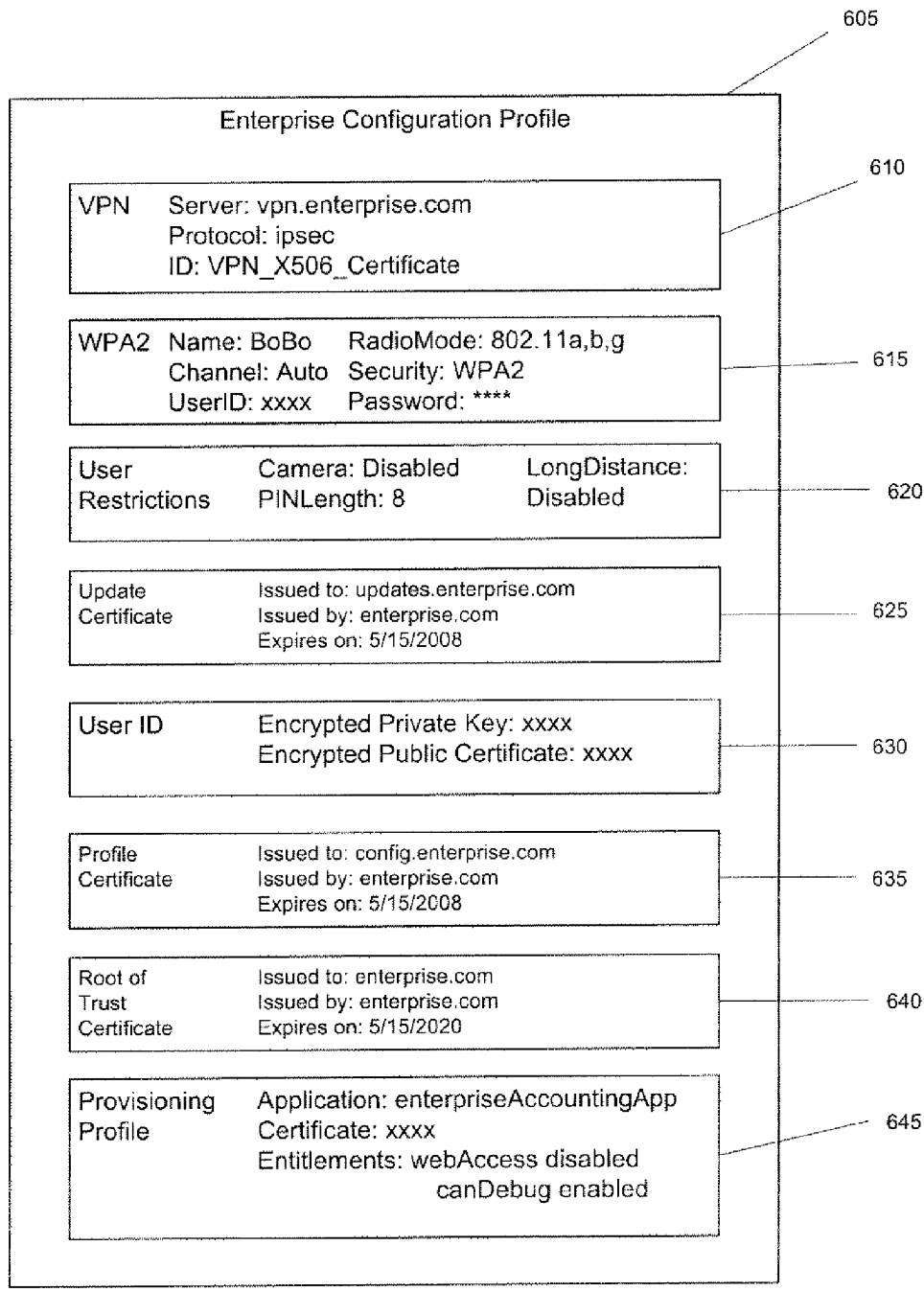
FIG. 9 shows a block diagram of one embodiment of a secure configuration profile and configuration components.

FIG. 6 shows a block diagram of one embodiment of a secure configuration profile. FIG. 9 shows, in greater detail, the secure configuration profile 605 shown in FIG. 6. The following discussion of the components of profile 605 applies to FIGS. 6 and 9. Profile 605 includes VPN 610, WPA2 615, user restrictions 620, update certificate 625, user ID 630, profile certificate 635, root of trust 640, and provisioning profile 645. In one embodiment, an enterprise distributes profile 605 to devices owned by the enterprise to set a device policy for the device. In one embodiment, VPN 610 and WPA2 615 provide configuration data allowing the device to connect to the enterprise virtual private network and wireless internet network. In one embodiment, user restriction 620 enforces enterprise policy as to how a user may use a device. For example, restrictions 620 may disable the device's camera, or enforce a longer PIN length than is standard on the device. In the latter case, restrictions 620 enables previously unavailable functionality by allowing the device to behave in a new manner (e.g., capable of using a longer PIN).

In one embodiment, update certificate 625 indicates to the device (and through the device, to the user) that the enterprise may update profile 605 through subsequent profiles signed with certificate 625. In one embodiment, certificate 625 is the same certificate as certificate 635. In one embodiment, certificate 625 and certificate 635 are certificates formatted according to the X.509 standard. In one embodiment, user ID 630 is an identity or digital signature provided by the enterprise to the user. In one embodiment, ID 630 is a PKCS#12 container for a storing private keys and accompanying public certificates, protected with a symmetric key. ID 630 is described in greater detail below in conjunction with FIG. 10. In one embodiment, profile certificate 635 is used by the device to authenticate profile 605 and ensure that profile 605 originated with the enterprise. In one embodiment, root of trust 640 is a certificate provided by the enterprise to enable the device to authenticate, for example, a secured website that is signed using the enterprise as the signature authority.

In one embodiment, provisioning profile 645 is included in profile 605 to authenticate an application on the device and to provide the device with the entitlements corresponding to the application. For example, a user might download a proprietary application used by the enterprise on the device. In one embodiment, the device is not permitted to execute the code image of the application until it has been verified and even if it has been verified, the entitlements may specify limits on the use of the application. Verification of an application may be provided with a provisioning profile. In one embodiment, entitlements of the application are included by the enterprise in the application verification. Application entitlements describe the extent to which an application may directly and indirectly utilize the functionality of a device. For example, an application may not be entitled to use the network interface on the device or the application may only be allowed to operate for a limited period of time, or the camera is disabled when the application is executing or the cellular telephone is disabled when the application is executing, etc. These entitlements may be created on an application by application basis (e.g. each application is restricted by its own associated entitlement) or the entitlements may establish how a group of applications behave on a device (e.g. a common set of restrictions for the applications in the group).

Figure 10:
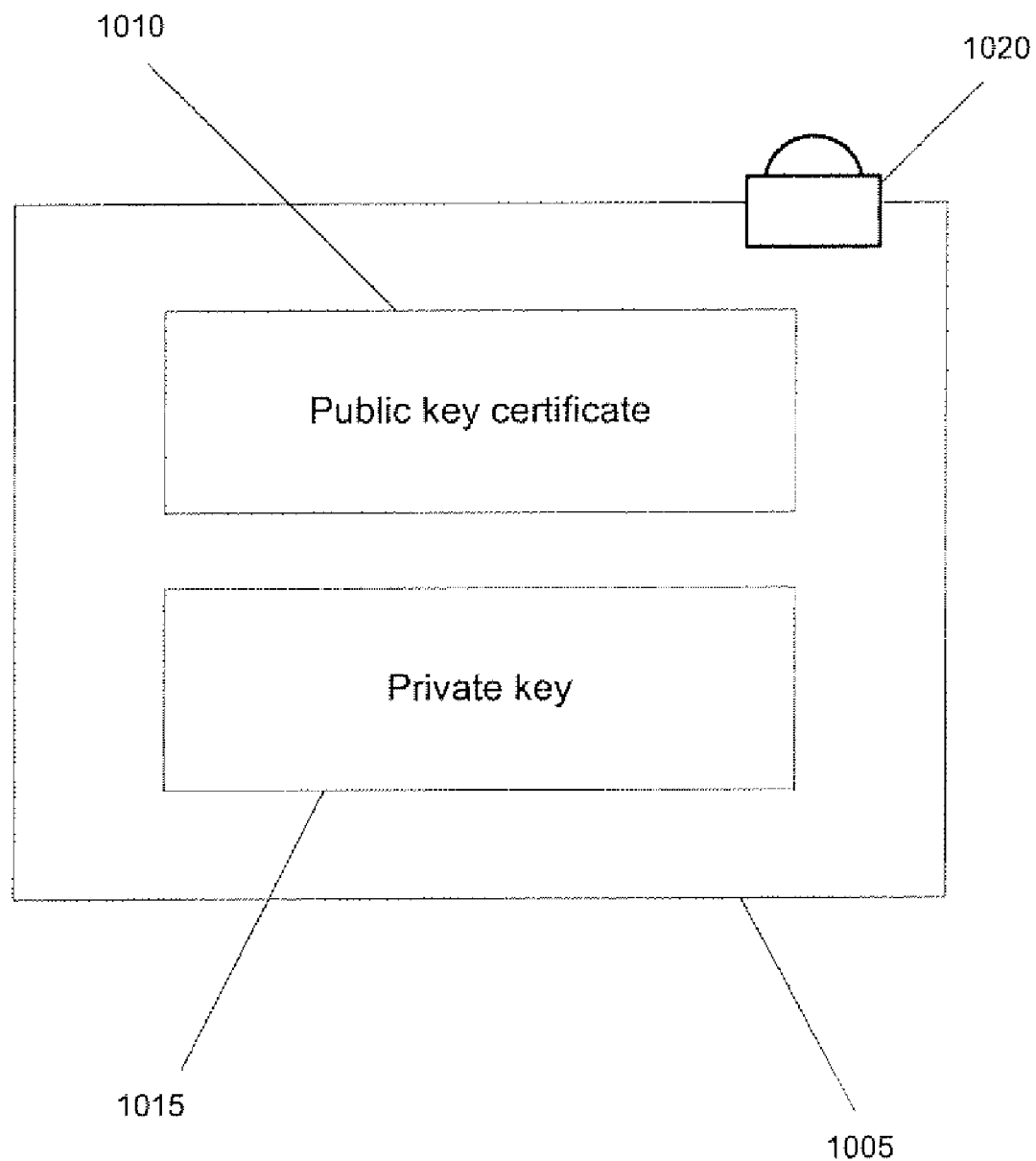
FIG. 10 shows a block diagram of one embodiment of an identity.

FIG. 10 shows a block diagram of one embodiment of an identity. Identity 1005 is formatted according to the PKCS#12 standard published by RSA Laboratories. Identity 1005 contains public key certificate 1010 and private key 1015, which together allow the digital signing of e-mails, documents, etc. To protect the identity 1005 from identity theft, certificate 1010 and key 1015 are encrypted within the container using symmetric key encryption 1020.

Figure 8:
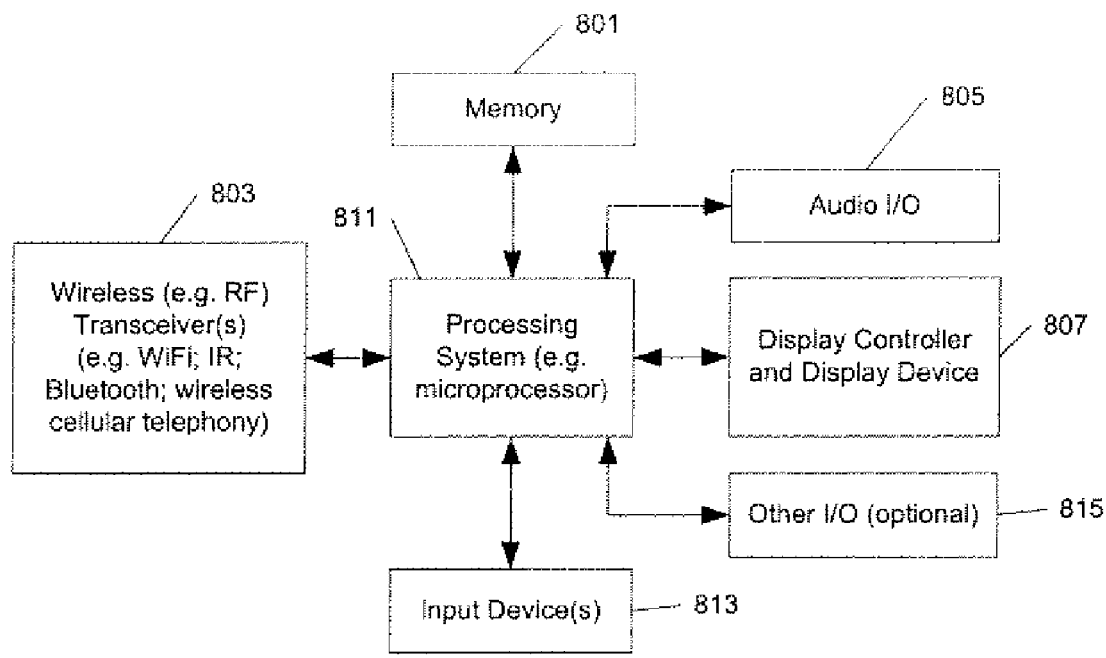
FIG. 8 shows one example of a data processing system which may be used in conjunction with the embodiments described herein.

The one or more profiles described herein may be created on a host data processing system or server data processing system and then transmitted and installed on a device, such as a wireless device shown in FIG. 8. The profiles are typically created in response to a request from a device and then transmitted and installed on the device; the transmission of the profiles may be completely through wires (e.g., the device is coupled to a host system through a wired dock or cable) or at least in part through a wireless (e.g., RF radio) connection. The one or more profiles may be created and/or installed with the assistance of one or more application programs which are executed on a host data processing system or a server data processing system.

In one embodiment, a host data processing system may determine that a configuration profile should be removed from a wireless device. The host data processing system may transmit a command to the wireless device which causes the wireless device to render the configuration profile inoperable on the wireless device. For example, if a wireless device is stolen, the host data processing system could disable the wireless device by rendering the configuration profile inoperable. An inoperable configuration profile may deny user access to the device, delete all data from the device, etc. In another embodiment, the host data processing system may transmit a command to the wireless device causing the wireless device to automatically transmit location information to the host data processing system (e.g., GPS coordinates).

Figure 11:
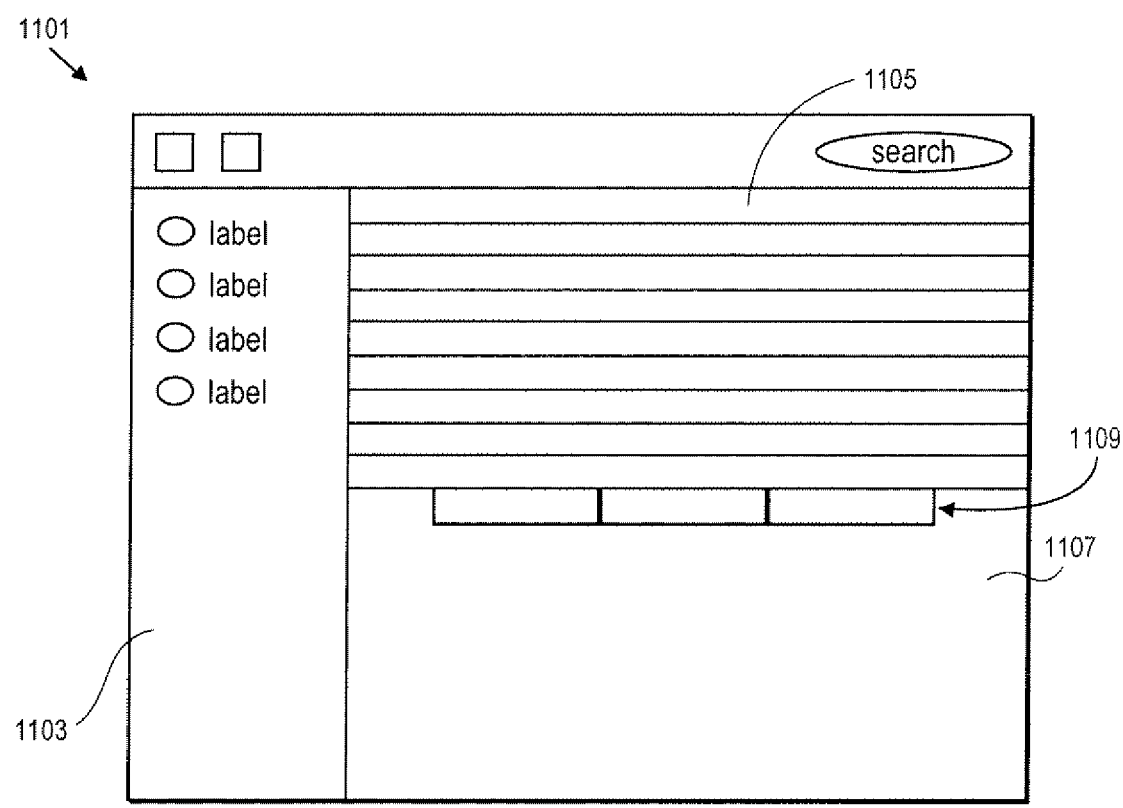
FIG. 11 shows an example of a user interface which may be used to create or install one or more configuration profiles or provisioning profiles.

FIG. 11 shows an example of a user interface created and displayed by such an application program. The application program may be used to create one or more profiles (which can then be transmitted to a device) or may be used to install previously created profiles (e.g. a profile loaded onto a host can then be installed on a device coupled to the host) or may be used to both create and install one or more profiles. The profiles may be the configuration profiles described herein which may or may not include provisioning profiles, or the profiles may be merely provisioning profiles (e.g. profiles without configuration intervention which configure a device for secure communication through a network of devices).

In one embodiment, the user interface shown in FIG. 11 may be used to download and install at least one previously created profile onto a device, such as a wireless cellular telephone having an architecture shown in FIG. 8. In another embodiment, the user interface shown in FIG. 11 may be used to manually create profiles which can then be uploaded to a distribution server data processing system (such as the server system shown in FIG. 1) to allow distribution (e.g., through e-mail, FTP, HTTP, etc.) of the created profiles. The user interface shown in FIG. 11 includes a window 1101 which includes three regions: a source list view region 1103, a selection list view region 1105, and a detail view region 1107 which includes a plurality of tabs 1109.

The source list view region 1103 may display device records, provisions (e.g., provisioning profiles for applications), configuration profiles (e.g., to configure a VPN connection between a device and one or more servers of an enterprise), and connected devices. The user may select items displayed within the region 1103. After the selection, the user may perform an operation (e.g., profile creation, editing, removal, distribution, etc.) on the selected item. The selection list view region 1105 may display items relating to an item selected in the region 1103. For example, if a user selects an item, such as a provisioning profile or a configuration profile, in the region 1103, further information and/or commands relating to the item selected in region 1103 can be displayed in the selection list view region 1105. If the item selected in region 1103 is a configuration profile, the region 1105 may display information relating to that profile, such as the type of communication configured by the profile (e.g., a secure VPN) and other information (e.g., see FIG. 9).

The detail view region 1107 may be a tabbed interface to display, edit, or create the context of the selected item (e.g., to display and edit a provisioning profile or a configuration profile). The detail view region 1107 may be a tabbed interface to display, edit, and create device record information (e.g., owner and/or contact information), profiles (e.g., allows for complete creation and/or management of configuration profiles and/or provisioning profiles), and connected devices (e.g., allows for management of configuration profile distribution).

Figure 7:
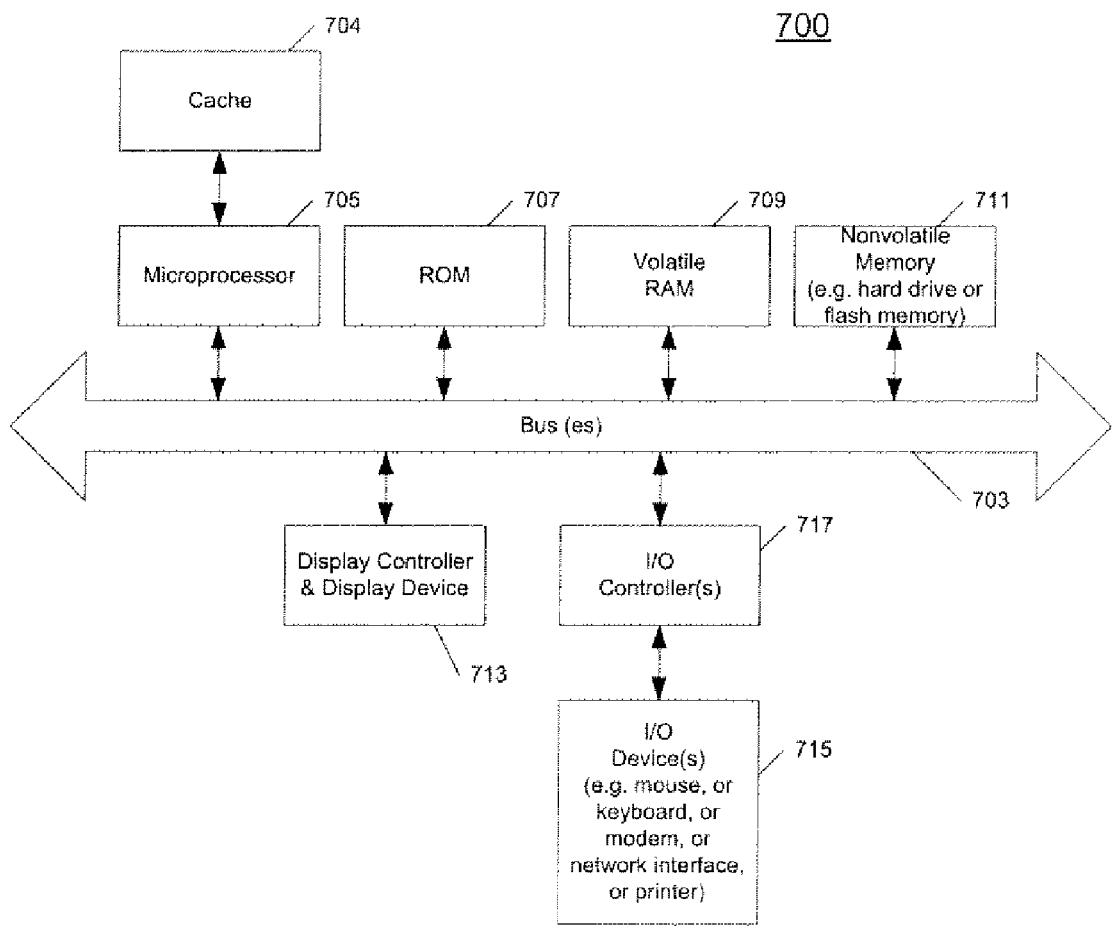
FIG. 7 shows one example of a typical computer system which may be used in conjunction with the embodiments described herein.

FIG. 7 shows one example of a data processing system which may be used with one embodiment of the present invention. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. FIG. 7 may represent the server system shown in FIG. 1.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 is coupled to cache 704. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 713 and to peripheral devices such as input/output (I/O) devices which may be mice, keyboards, modems, network interfaces, printers and other devices which are well known in the art. Typically, the input/output devices 715 are coupled to the system through input/output controllers 717. The volatile RAM (Random Access Memory) 709 is typically implemented as dynamic RAM (DRAM) which requires power continually in order to refresh or maintain the data in the memory.

The mass storage 711 is typically a magnetic hard drive or a magnetic optical drive or an optical drive or a DVD RAM or a flash memory or other types of memory systems which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

FIG. 8 shows an example of another data processing system which may be used with one embodiment of the present invention. The data processing system 800 shown in FIG. 8 includes a processing system 811, which may be one or more microprocessors, or which may be a system on a chip integrated circuit, and the system also includes memory 801 for storing data and programs for execution by the processing system. The system 800 also includes an audio input/output subsystem 805 which may include a microphone and a speaker for, for example, playing back music or providing telephone functionality through the speaker and microphone. The system 800 can, in at least certain embodiments, request the one or more profiles described herein and download those profiles to configure the device for communication through a network. The system 800 can download those profiles from a server data processing system which may be the system shown in FIG. 7. In one embodiment, the system 800 may be the device 105 shown in FIG. 1.

A display controller and display device 807 provide a visual user interface for the user; this digital interface may include a graphical user interface which is similar to that shown on a Macintosh computer when running OS X operating system software. The system 800 also includes one or more wireless transceivers 803 to communicate with another data processing system, such as the system 700 of FIG. 7. A wireless transceiver may be a WiFi transceiver, an infrared transceiver, a Bluetooth transceiver, and/or a wireless cellular telephony transceiver. It will be appreciated that additional components, not shown, may also be part of the system 800 in certain embodiments, and in certain embodiments fewer components than shown in FIG. 8 may also be used in a data processing system.

The data processing system 800 also includes one or more input devices 813 which are provided to allow a user to provide input to the system. These input devices may be a keypad or a keyboard or a touch panel or a multi touch panel. The data processing system 800 also includes an optional input/output device 815 which may be a connector for a dock. It will be appreciated that one or more buses, not shown, may be used to interconnect the various components as is well known in the art. The data processing system shown in FIG. 8 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 800 may be a network computer or an embedded processing device within another device, or other types of data processing systems which have fewer components or perhaps more components than that shown in FIG. 8.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method for configuring a wireless device, the method comprising:
  receiving a request, from the wireless device, to create a configurable profile, the request being received by a data processing system of an enterprise;
  creating, in response to the request, the configuration profile for the wireless device, the configuration profile being designed to configure the wireless device for communication with one or more data processing systems of the enterprise, and wherein the creating includes signing the configuration profile to allow the wireless device to authenticate the configuration profile, and the communication is a secure communication in which sender and receiver are authenticated to each other, security of the secure communication is configured by the configuration profile, the request is generated by one of a web browser program, an e-mail program or a media management program and wherein the configuration profile comprises at least one of a policy for use of the wireless device or a restriction on the use of the wireless device which effectively disables a feature of the wireless device, and the configuration profile is configured to have an updatable root of trust certificate and wherein the configuration profile comprises an identity which comprises an encrypted certificate and an encrypted key of a private key/public key pair; and transmitting the configuration profile to the wireless device with a connectionless network protocol.

2. The method as in claim 1 wherein the configuration profile specifies a minimum size of a PIN (personal identification number) to be entered by a user of the wireless device.

3. The method as in claim 1 wherein the configuration profile is transmitted wirelessly, at least in a portion of a path, to the wireless device and wherein the configuration profile is created in response to options selected by the user.

4. The method as in claim 1 wherein the method is performed by one or more servers configured to perform the method on behalf of the enterprise.

5. A machine implemented method for configuring a wireless device, the method comprising:

receiving, at the wireless device, an input for a request to establish communication with at least one data processing system of an enterprise;

receiving, in response to the request, a configuration profile for the wireless device, the configuration profile being designed to configure the wireless device for communication with the at least one data processing system of the enterprise, wherein the configuration profile is signed to allow the wireless device to authenticate the configuration profile, and the communication is a secure communication in which sender and receiver are authenticated to each other, security of the secure communication is configured by the configuration profile, the configuration profile is received through a connectionless network protocol, the request is generated by one of a web browser program, an e-mail program or a media management program and wherein the configuration profile comprises at least one of a policy for use of the wireless device or a restriction on the use of the wireless device which effectively disables a feature of the wireless device, and the configuration profile is configured to have an updatable root of trust certificate and wherein the configuration profile comprises an identity which comprises an encrypted certificate and an encrypted key of a private key/public key pair.

6. The method as in claim 5 wherein the configuration profile specifies a minimize size of a PIN to be entered by a user of the wireless device.

7. The method as in claim 5 wherein the configuration profile is received wirelessly and wherein the configuration profile is created based on options selected by a user of the wireless device.

8. The method as in claim 5 wherein a user of the wireless device creates the configuration profile from a wireless, in part, connection to a website and receives the configuration profile through a download process.

9. A machine implemented method for configuring a wireless device, the method comprising:

receiving a request, from the wireless device, to transmit a configuration profile, the request being received by a data processing system of an enterprise; and transmitting, in response to the request, the configuration profile for the wireless device, wherein the configuration profile configures the wireless device for communication with one or more data processing systems of the enterprise, and wherein the configuration profile is signed to allow the wireless device to authenticate the configuration profile, and the communication is a secure communication in which sender and receiver are authenticated to each other, security of the secure communication is configured by the configuration profile, the configuration profile is transmitted with a connectionless network protocol, the request is generated by one of a web browser program, an e-mail program or a media management program and wherein the configuration profile comprises at least one of a policy for use of the wireless device or a restriction on the use of the wireless device which effectively disables a feature of the wireless device and the configuration profile is configured to have an updatable root of trust certificate and wherein the configuration profile comprises an identity which comprises an encrypted certificate and an encrypted key of a private key/public key pair.

10. The method as in claim 9 wherein the configuration profile specifies a minimum size of a PIN (personal identification number) to be entered by a user of the wireless device.

11. A machine-readable storage medium storing instructions which when executed by a data processing system cause the data processing system to perform a method of processing data, the method comprising:

receiving a request, from the wireless device, to create a configuration profile, the request being received by a data processing system of an enterprise;

creating, in response to the request, the configuration profile for the wireless device, the configuration profile being designed to configure the wireless device for communication with one or more data processing systems of the enterprise, and wherein the creating includes signing the configuration profile to allow the wireless device to authenticate the configuration profile, and the communication is a secure communication in which sender and receiver are authenticated to each other, security of the secure communication is configured by the configuration profile, the request is generated by one of a web browser program, an e-mail program or a media management program and wherein the configuration profile comprises at least one of a policy for use of the wireless device or a restriction on the use of the wireless device which effectively disables a feature of the wireless device, and the configuration profile is configured to have an updatable root of trust certificate and wherein the configuration profile comprises an identity which comprises an encrypted certificate and an encrypted key of a private key/public key pair; and transmitting the configuration profile to the wireless device with a connectionless network protocol.

12. The machine-readable storage medium as in claim 11 wherein the configuration profile specifies a minimum size of a PIN (personal identification number) to be entered by a user of the wireless device.

13. The machine-readable storage medium as in claim 11 wherein the configuration profile is transmitted wirelessly, at least in a portion of a path, to the wireless device and wherein the configuration profile is created in response to options selected by the user.

14. The machine-readable storage medium as in claim 11 wherein the method is performed by one or more servers configured to perform the method on behalf of the enterprise.

15. A machine-readable storage medium storing instructions which when executed by a data processing system cause the data processing system to perform a method of processing data, the method comprising:

receiving, at the wireless device, an input for a request to establish communication with at least one data processing system of an enterprise;

receiving, in response to the request, a configuration profile for the wireless device, the configuration profile being designed to configure the wireless device for communication with the at least one data processing system of the enterprise, wherein the configuration profile is signed to allow the wireless device to authenticate the configuration profile, and the communication is a secure communication in which sender and receiver are authenticated to each other, security of the secure communication is configured by the configuration profile, the configuration profile is received through a connectionless network protocol, the request is generated by one of a web browser program, an e-mail program or a media management program and wherein the configuration profile comprises at least one of a policy for use of the wireless device or a restriction on the use of the wireless device which effectively disables a feature of the wireless device, and the configuration profile is configured to have an updatable root trust certificate and wherein the configuration profile comprises an identity which comprises an encrypted certificate and an encrypted key of a private key/public key pair.

16. The machine-readable storage medium as in claim 15 wherein the configuration profile specifies a minimize size of a PIN to be entered by a user of the wireless device.

17. The machine-readable storage medium as in claim 15 wherein the configuration profile is received wirelessly and wherein the configuration profile is created based on options selected by a user of the wireless device.

18. The machine-readable storage medium as in claim 15 wherein a user of the wireless device creates the configuration profile from a wireless, in part, connection to a website and receives the configuration profile through a download process.

19. A machine-readable storage medium storing instructions which when executed by a data processing system cause the data processing system to perform a method of processing data, the method comprising:

receiving a request, from the wireless device, to transmit a configuration profile, the request being received by a data processing system of an enterprise; and transmitting, in response to the request, the configuration profile for the wireless device, wherein the configuration profile configures the wireless device for communication with one or more data processing systems of the enterprise, and wherein the configuration profile is signed to allow the wireless device to authenticate the configuration profile, and the communication is a secure communication in which sender and receiver are authenticated to each other, security of the secure communication is configured by the configuration profile, the configuration profile is transmitted with a connectionless network protocol, the request is generated by one of a web browser program, an e-mail program or a media management program and wherein the configuration profile comprises at least one of a policy for use of the wireless device or a restriction on the use of the wireless device which effectively disables a feature of the wireless device, and the configuration profile is configured to have an updatable root of trust certificate and wherein the configuration profile comprises an identity which comprises an encrypted certificate and an encrypted key of a private key/public key pair.

20. The machine-readable storage medium as in claim 19 wherein the configuration profile specifies a minimum sire of a PIN (personal identification number) to be entered by a user of the wireless device.

21. A data processing system comprising:

means for receiving a request, from the wireless device, to create a configuration profile, the request being received by a data processing system of an enterprise;

means for creating, in response to the request, the configuration profile for the wireless device, the configuration profile being designed to configure the wireless device for communication with one or more data processing systems of the enterprise, and wherein the creating includes signing the configuration profile to allow the wireless device to authenticate the configuration profile, and the communication is a secure communication in which sender and receiver are authenticated to each other, security of the secure communication is configured by the configuration profile the request is generated by one of a web browser program, an e-mail program or a media management program and wherein the configuration profile comprises at least one of a policy for use of the wireless device or a restriction on the use of the wireless device which effectively disables a feature of the wireless device, and the configuration profile is configured to have an updatable root of trust certificate and wherein the configuration profile comprises an identity which comprises an encrypted certificate and an encrypted key of a private key/public key pair; and means for transmitting the configuration profile to the wireless device with a connectionless network protocol.

22. A data processing system comprising:

means for receiving, at the wireless device, an input for a request to establish communication with at least one data processing system of an enterprise;

means for receiving, in response to the request, a configuration profile for the wireless device, the configuration profile being designed to configure the wireless device for communication with the at least one data processing system of the enterprise, wherein the configuration profile is signed to allow the wireless device to authenticate the configuration profile, and the communication is a secure communication in which sender and receiver are authenticated to each other, security of the secure communication is configured by the configuration profile, the configuration profile is received through a connectionless network protocol, the request is generated by one of a web browser program, an e-mail program or a media management program and wherein the configuration profile comprises at least one of a policy for use of the wireless device or a restriction on the use of the wireless device which effectively disables a feature of the wireless device, and the configuration profile is configured to have an updatable root of trust certificate and wherein the configuration profile comprises an identity which comprises an encrypted certificate and an encrypted key of a private key/public key pair.

23. A data processing system comprising:

means for receiving a request, from the wireless device, to transmit a configuration profile, the request being received by a data processing system of an enterprise; and means for transmitting, in response to the request, the configuration profile for the wireless device, wherein the configuration profile configures the wireless device for communication with one or more data processing systems of the enterprise, and wherein the configuration profile is signed to allow the wireless device to authenticate the configuration profile, and the communication is a secure communication in which sender and receiver are authenticated to each other, security of the secure communication is configured by the configuration profile, the configuration profile is transmitted with a connectionless network protocol, the request is generated by one of a web browser program, an e-mail program or media management program and wherein the configuration profile comprises at least one of a policy for use of the wireless device or a restriction on the use of the wireless device which effectively disables a feature of the wireless device, and the configuration profile is configured to have an updatable root of trust certificate and wherein the configuration profile comprises an identity which comprises an encrypted certificate and an encrypted key of a private key/public key pair.

* * * * *